US009414246B2

(12) United States Patent
Arulprakasam et al.

(10) Patent No.: US 9,414,246 B2
(45) Date of Patent: Aug. 9, 2016

(54) METHODS AND APPARATUS FOR ENHANCED NETWORK ACTIVITY DETERMINATIONS

(71) Applicant: Qualcomm Incorporated, San Diego, CA (US)

(72) Inventors: Rajasekar Arulprakasam, San Diego, CA (US); Jimmy Chi-Wai Chui, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 13/776,639

(22) Filed: Feb. 25, 2013

(65) Prior Publication Data

US 2014/0241179 A1    Aug. 28, 2014

(51) Int. Cl.
    *H04W 24/08*        (2009.01)
(52) U.S. Cl.
    CPC .................. *H04W 24/08* (2013.01)
(58) Field of Classification Search
    None
    See application file for complete search history.

(56) References Cited

U.S. PATENT DOCUMENTS

| 8,305,969 | B2 | 11/2012 | Nobukiyo et al. |
| 8,768,264 | B2* | 7/2014 | Chakraborty et al. .......... 455/69 |
| 2004/0156353 | A1* | 8/2004 | Bevan et al. ................... 370/351 |
| 2005/0025109 | A1* | 2/2005 | Ratasuk et al. ................ 370/342 |
| 2006/0203821 | A1* | 9/2006 | Mizusawa et al. ............. 370/392 |
| 2009/0154400 | A1* | 6/2009 | Nobukiyo et al. ............. 370/329 |
| 2009/0296798 | A1* | 12/2009 | Banna ................ H04B 1/70754 375/229 |
| 2010/0008405 | A1 | 1/2010 | Valadon |
| 2010/0034114 | A1* | 2/2010 | Kim et al. ...................... 370/252 |
| 2010/0091696 | A1* | 4/2010 | Lee et al. ....................... 370/312 |
| 2010/0118707 | A1* | 5/2010 | Im et al. ........................ 370/241 |
| 2011/0149757 | A1* | 6/2011 | Hu et al. ........................ 370/252 |
| 2011/0228756 | A1* | 9/2011 | Kim et al. ...................... 370/338 |
| 2012/0082197 | A1* | 4/2012 | Jonsson et al. ................ 375/224 |
| 2012/0099430 | A1* | 4/2012 | Vos .......................... H04L 47/10 370/235 |
| 2014/0133523 | A1* | 5/2014 | Xu et al. ........................ 375/148 |
| 2014/0241179 | A1* | 8/2014 | Arulprakasam et al. ...... 370/252 |

FOREIGN PATENT DOCUMENTS

WO       2012096600 A1    7/2012

OTHER PUBLICATIONS

International Search Report and Written Opinion—PCT/US2014/016970—ISA/EPO—Jun. 18, 2014.
TD Tech, "Simulation results for standalone midamble", 3GPP TSG RAN WG1#52bis, Tdoc R1-081601, Mar 2008, 4pgs.

\* cited by examiner

*Primary Examiner* — Ian N Moore
*Assistant Examiner* — Lakeram Jangbahadur
(74) *Attorney, Agent, or Firm* — Arent Fox LLP

(57) ABSTRACT

Methods and apparatus of wireless communication include receiving channel information and performing a first network activity estimation using at least a portion of the channel information. The first network activity estimation provides a first network activity indication. Moreover, the methods and apparatus include performing a second network activity estimation using at least another portion of the channel information. The second activity estimation provides a second network activity indication. Also, the method and apparatus include aggregating the network activity indications.

35 Claims, 15 Drawing Sheets

METHODS AND APPARATUS FOR ENHANCED NETWORK ACTIVITY DETERMINATIONS

BACKGROUND

1. Field

Aspects of the present disclosure relate generally to wireless communication systems, and more particularly, to wireless communication network activity determinations.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless communication networks, base stations (e.g., nodeB) allocate sets of codes intended for a shared control channel (SCCH). A user equipment (UE) using the SCCH may be assigned a subset of the SCCH codes for facilitating UE communication with the network. Upon receiving SCCH codes from the network, UEs can decode the transmission using an identifier (e.g., HS-DSCH Radio Network Transaction Identifier) to determine whether the cyclic redundancy check (CRC) is satisfied. Only after such verification can the UE extract and process information from the transmission. However, if verification fails, the UE cannot extract and process the transmitted information. The foregoing provides an example demonstrating the extent to which network activity communications are provided to the UE. In fact, UEs are typically provided with minimal information from the network regarding network activity. As such, in current implementations, UEs are limited in determining various aspects of network activity on a particular channel, such as load on SCCH.

Thus, enhancements in wireless communication network activity determinations are desired.

SUMMARY

In one aspect, a method of wireless communication includes receiving channel information. The method further includes performing a first network activity estimation using at least a portion of the channel information, wherein the first network activity estimation provides a first network activity indication. Moreover, the method includes performing a second network activity estimation using at least another portion of the channel information, wherein the second activity estimation provides a second network activity indication. Also, the method includes aggregating the network activity indications.

In another aspect, a computer program product for wireless communications comprising a computer-readable medium includes instructions executable by a computer. For example, computer-readable medium includes at least one instruction for receiving channel information. The computer-readable medium further includes at least one instruction for performing a first network activity estimation using at least a portion of the channel information, wherein the first network activity estimation provides a first network activity indication. Moreover, the computer-readable medium includes at least one instruction for performing a second network activity estimation using at least another portion of the channel information, wherein the second activity estimation provides a second network activity indication. Also, the computer-readable medium includes at least one instruction for aggregating the network activity indications.

Another aspect of the disclosure provides an apparatus for wireless communications including means for receiving channel information. Also, the apparatus includes means for performing a first network activity estimation using at least a portion of the channel information, wherein the first network activity estimation provides a first network activity indication. Moreover, the apparatus includes means for performing a second network activity estimation using at least another portion of the channel information, wherein the second activity estimation provides a second network activity indication. Further, the apparatus includes means for aggregating the network activity indications.

Additional aspects provide a user equipment apparatus for wireless communications including a processor configured to receive channel information. Further, the processor can be configured to perform a first network activity estimation using at least a portion of the channel information, wherein the first network activity estimation provides a first network activity indication. Moreover, the processor can be configured to perform a second network activity estimation using at least another portion of the channel information, wherein the second activity estimation provides a second network activity indication. Also, the processor can be configured to aggregate the network activity indications.

These and other aspects of the invention will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to enhanced user equipment (UE) network activity determinations. In particular, issues arise in performing communication procedures as a result of limited system state information provided to UEs from the network. Typically, explicit system state information is available and made use of only at the network. However, the network does provide some system state information in the form of channel information to UEs. In fact, the channel information includes information related to multiple users on a particular channel. However, UEs typically utilize only a portion of the channel information pertaining to their respective resource allocation (e.g., scheduling data). That is, UEs fail to utilize the transmitted information related to other UEs on a given channel. As such, although explicit indication is not provided by the network to the UE regarding the network activity (e.g., channel load), according to the present aspects, the UE can nonetheless estimate the network activity based on the limited channel information. Moreover, by determining network activity as described herein, UEs and/or networks can predict user experience characteristics (e.g., throughput). Such predictions may provide UEs with advanced activity scheduling capabilities. Further, the predictions may enable UEs to select from a plurality of available network connections. Accordingly, in some aspects, the present methods and apparatuses may provide an efficient solution, as compared to current solutions, to determine network activity based on limited channel information.

Figure 1:
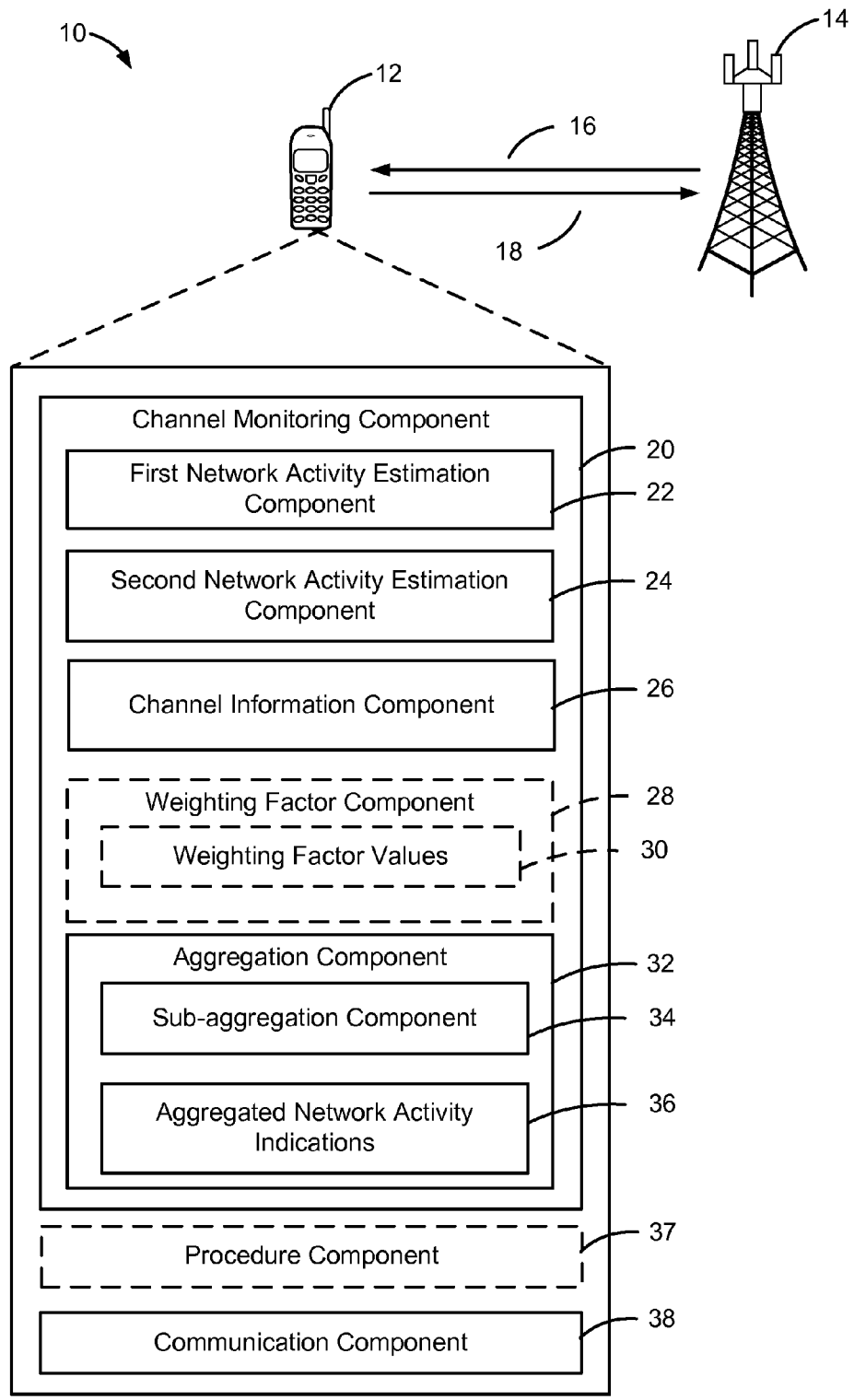
FIG. 1 is a schematic diagram of a communication network including an aspect of a user equipment that may perform channel monitoring.

Referring to FIG. 1, in one aspect, a wireless communication system 10 includes a UE 12 for performing channel monitoring. The UE 12 may be in communication coverage of at least one base station 14. In some aspects, multiple UEs may be in communication coverage with one or more base stations including the base station 14. In an example, the UE 12 may receive wireless transmissions from the base station 14. Such wireless transmissions may include channel information 16 related to UE scheduling parameters and/or allocated resources on a particular communication channel of a base station (e.g., base station 14). Further, the UE 12 may communicate with the base station 14 on one or more channels of a given technology type (e.g., WCDMA) such as, but not limited to, high-speed downlink shared channel (HS-DSCH) and high-speed shared communication channel (HS-SCCH). Additionally, base station 14 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

According to the present aspects, UE 12 may include a channel monitoring component 20 configured to monitor or otherwise determine network activity on one or more communication channels. For example, the channel monitoring component 20 may determine the load utilization level on a particular high-speed channel (e.g., SCCH) based on the channel information 16. In particular, channel monitoring component 20 may include a first network activity estimation component 22 configured to perform a first network activity estimation using the channel information 16. For example, the first network activity estimation component 22 receives, as an input from a channel information component 26 that determines channel information 16, one or more portions of channel information 16. The first network activity estimation component 22 may provide or otherwise generate one or more first network activity indications (e.g., network activity indications 52, FIG. 2) representing a network activity level based on, for example, the presence and/or absence of a user (e.g., UE) on a communication channel scheduling scheme. Further aspects regarding the first network activity estimation component 22 are described herein with respect to FIG. 2.

In some aspects, channel monitoring component 20 may include a second network activity estimation component 24 configured to perform a second network activity estimation using the channel information 16. For example, the second network activity estimation component 24 receives, as an input from the channel information component 26, one or more portions of the channel information 16. The second network activity estimation component 24 may then provide or otherwise generate one or more second network activity indications (e.g., network activity indications 70, FIG. 3) representing a network activity level based on, for example, the resulting output of a decoder (e.g., decoder 62, FIG. 3). Further aspects regarding the second network activity estimation component 24 are described herein with respect to FIG. 3.

Moreover, as noted, channel monitoring component 20 may include channel information component 26 configured to process and/or store the received channel information 16. For example, channel information component 26 may parse the channel information 16 for code portions (e.g., SCCH codes). In addition, the channel information component 26 may receive pre-parsed code portions from another sub-component of the channel monitoring component 20 or another component of the UE 12. In another aspect, the channel information component 26 may store the channel information 16 including the code portions for subsequent transmission to one or more sub-components of the channel monitoring component 20 or various other UE 12 components. For example, upon receiving a request from the first network activity estimation component 22, the channel information component 26 may provide the unparsed channel information 16 and/or the parsed shared channel data to the first network activity estimation component 22 and the second network activity estimation component 24. Additional aspects regarding the channel monitoring component 20 are described herein with respect to FIG. 4.

Further aspects of the channel monitoring component 20 may optionally include a weighting factor component 28 configured to assign or otherwise associate a weighting factor value 30 for each of the outputs of the network activity estimation components 22 and 24. For example, the output of the first network activity estimation component 22 may be a first network activity indication (e.g., network activity indication 52, FIG. 2). The first network activity indication 52 may be assigned a weighting factor value 30 signifying a level of significance or effect the first network activity indication 52 may have in the subsequent aggregation of multiple network activity indications. In other words, the aggregation of the network activity indications may be based on the weighting factor value 30 assigned to the network activity indications (e.g., first and second network activity indications 52, FIG. 2, and 70, FIG. 3) by the weighting factor component 28. Moreover, in some aspects, weighting factor component 28 may determine and/or generate autonomously or by way of host instruction, respective weighting factor values 30 for the output of each network activity estimation component (e.g., components 22 and 24) and/or the network activity indications thereof. As an example, an algorithm stored in or considered part of the weighting factor component 28 may determine the weighting factor values 30 of each network activity component (e.g., components 22 and 24) based on a history of the network activity components. In an aspect, the history may be considered the prior accuracy level of a presence and/or absence of a particular UE corresponding to a user on received channel information (e.g., SCCH) of a transfer time interval (TTI). Accordingly, upon analyzing the history of the identified user presence and/or absence, the weighting factor component 28 may autonomously modify the weighting factor values 30 accordingly. For instance, if the accuracy level of the first network activity estimation component 22 increases, the weighting factor component 28 may increase the weighting factor values 30 associated with the network activity indications (e.g., network activity indications 52) of the first network activity estimation component 22. Also, the weighting factor values 30 may be programmable and/or user configurable. In additional aspects, the weighting factor component 28 may assign and modify the network activity indications based on the assigned weight factor values 30. The weighting factor component 28 may subsequently provide the weighted and/or modified network activity indications to the aggregation component 32 for aggregation.

Additional aspects of the channel monitoring component 20 may include an aggregation component 32 configured to aggregate the network activity indications (e.g., indications 52 and 70 of FIGS. 2 and 3, respectively) of the network activity estimation components (e.g., components 22 and 24). For example, the aggregation component 32 may receive the weighted and/or modified network activity indications from the weighting factor component 28 and conduct one or more arithmetic operations to obtain or otherwise generate an aggregated network activity indication 36. The aggregated network activity indications 36 may signify an overall network activity level, e.g. on a particular TTI or across multiple TTIs, for one or more channel information. Additionally, the aggregated network activity indications 36 may subsequently be provided to one or more components of the UE 12 or communicated to the network via base station 14.

For instance, the aggregated network activity indications may optionally be provided to the procedure component 37, which may be configured to perform one or more communication procedures based on the aggregated network activity indications. In some aspects, the aggregated network activity indications 36 may be utilized by the procedure component 37 for determining the network activity impact (e.g., network load) on achievable throughput of the UE 12. Moreover, the procedure component 37 may utilize the aggregated network activity indications 36 to identify the network congestion levels on a particular communication channel. Such information may assist in reducing network congestion as well as identify uncongested communication channels to UEs (e.g., UE 12) thereby optimizing channel resource allocation and enhancing spectral efficiency. For example, UEs (e.g., UE 12) requiring bandwidth intensive communications may schedule such procedures during periods of low network activity. As a further example, UEs (e.g., UE 12) may prefer to establish active network connections with base stations (e.g., base station 14) and/or network providing entities having low network activity levels. Additionally, procedure component 37 may select a channel for establishing a communication, for example, if the activity is below a desired level as indicated and/or inferred by the aggregated network activity indications, or select another channel for communication, for example, if the activity is above a desired level as indicated and/or inferred by the aggregated network activity indications.

In other aspects, the aggregation component 32 may receive the network activity indications (e.g., indications 52 and 70) along with the weighting factor values 30 from the weighting factor component 28. The aggregation component 32 may then process and/or modify the network activity indications based on the assigned weighting factor values 30 to obtain weighted and/or modified network activity indications. Further, the aggregation component 32 may include a sub-aggregation component 34 configured to aggregate network activity indications across multiple portions of channel information 16 for a given network activity estimation. For example, the sub-aggregation component 34 may obtain or otherwise receive the weighted and/or modified network activity indications for one or more portions of channel information 16. The sub-aggregation component 34 may then aggregate or otherwise combine the weighted and/or modified network activity indications for the channel information 16 to obtain a sub-aggregated network activity indication for channel information 16. The sub-aggregated network activity indications may then be aggregated across multiple channel informations.

In an additional aspect, the UE 12 may include a communication component 38, which may be configured to transmit and receive communications 16 and/or 18 with the base station 14. For example, in an aspect, the communication component 38 may send the aggregated network activity indications 36 to the base station 14. Further, communication component 38 may include, but is not limited to, one or more of a transmitter, a receiver, a transceiver, protocol stacks, transmit chain components, and receive chain components.

Figure 2:
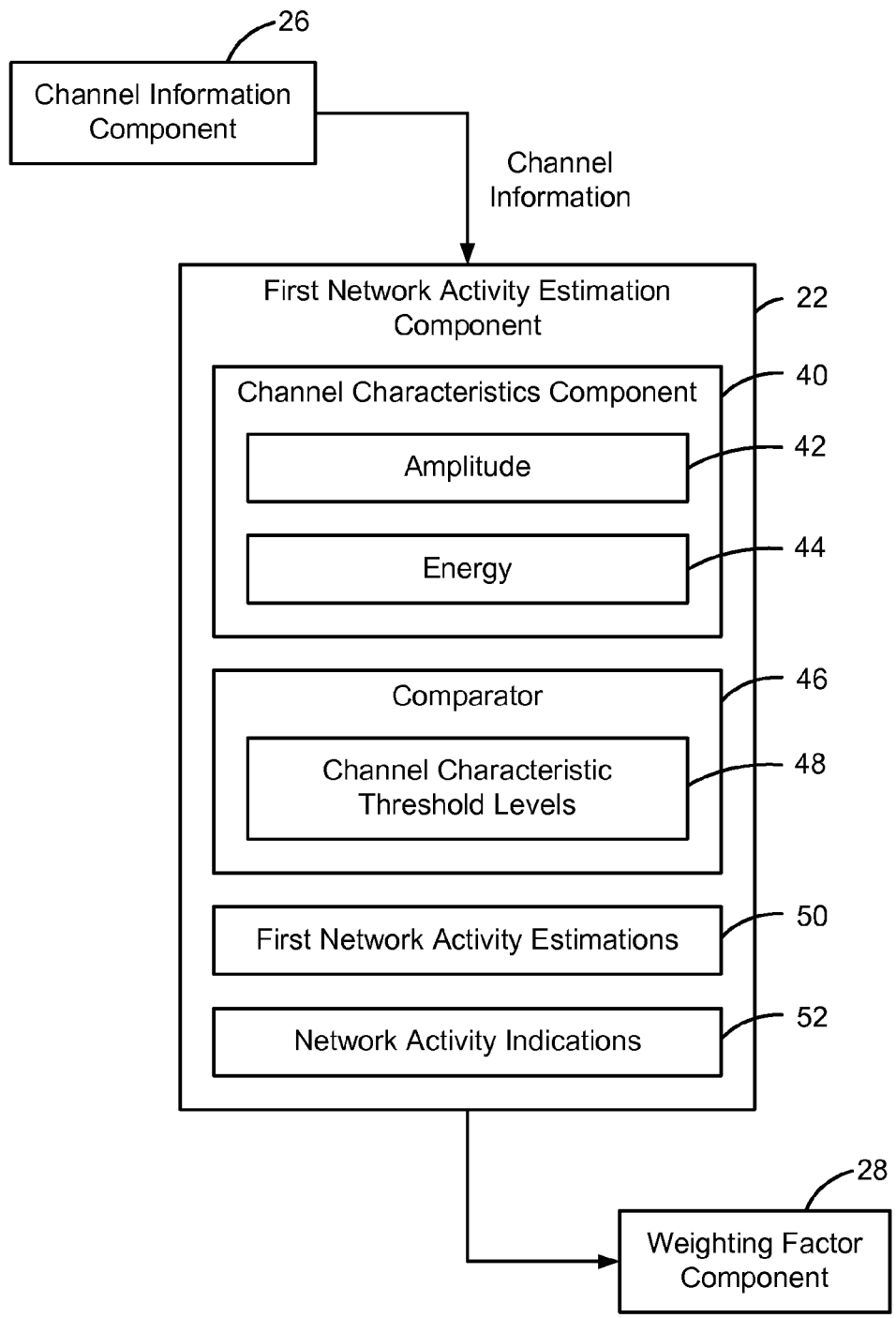
FIG. 2 is a schematic diagram of an aspect of the first network activity estimation component of FIG. 1.

Referring to FIG. 2, in an aspect, the first network activity estimation component 22 includes various subcomponents configured to perform one or more first network activity estimations 50 using received channel information 16 from channel information component 26. For example, the first network activity estimations 50 may utilize at least a portion of the channel information 16 to obtain one or more network activity indications 52. The first network activity estimation component 22 may include channel characteristics component 40, which may be configured to obtain or otherwise determine one or more channel characteristics based on the received channel information 16. Such channel characteristics may include, but are not limited to, amplitude 42 and energy 44 of one or more portions of channel information 16. For instance, the channel characteristic component 40 may receive the channel information 16 including a first code portion (e.g., first portion 88, FIG. 4) and a second code portion (e.g., second portion 92, FIG. 4). The channel characteristic component 40 may then obtain, extract, measure or otherwise determine various channel characteristics including amplitude 42 and/or energy 44 associated with one or more of the first code portion and second code portion of the received channel information 16. The channel characteristics may then be forwarded to comparator 46. Comparator 46 may be configured to compare the channel characteristics representing the amplitude 42 and/or energy 44 of the channel information 16 to a channel characteristic threshold level 48 to determine the presence and/or absence of a user on one or more portions of channel information 16. In other words, the comparator 46 may determine whether the received amplitude 42 and/or energy 44 are greater or less than the channel characteristic threshold level 48. For example, if the received amplitude 42 and/or energy 44 are greater than or equal to the channel characteristic threshold level 48, then the presence of a user on at least a portion of the channel information 16 can be indicated. However, if the received amplitude 42 and/or energy 44 are less than the channel characteristic threshold level 48, then the absence of a user on at least a portion of the channel information 16 can be indicated. In additional aspects, the comparison by the comparator may include a determination as to whether codes (e.g., SCCH codes) were transmitted for a different user on or as part of the channel information 16. The presence and/or absence of a different user associated with channel information 16 including one or more code portions may be represented as one or more network activity indications 52. Hence, the first network activity estimation component 22 provides network activity indications 52 based on the result of the comparator 46. Additionally, the first network activity estimation 50 may be repeated for every portion of channel information 16 assigned to a different user. Further, in some aspects, the channel characteristic threshold level 48 may be determined dynamically based on channel tracking conditions. For example, the first network activity estimation component 22 may dynamically determine the channel characteristic threshold level 48 using estimated signal-to-noise ratios (SNR), channel size and/or measurement/estimation history. The network activity indications 52 may be forwarded to the weighting factor component 28.

Figure 3:
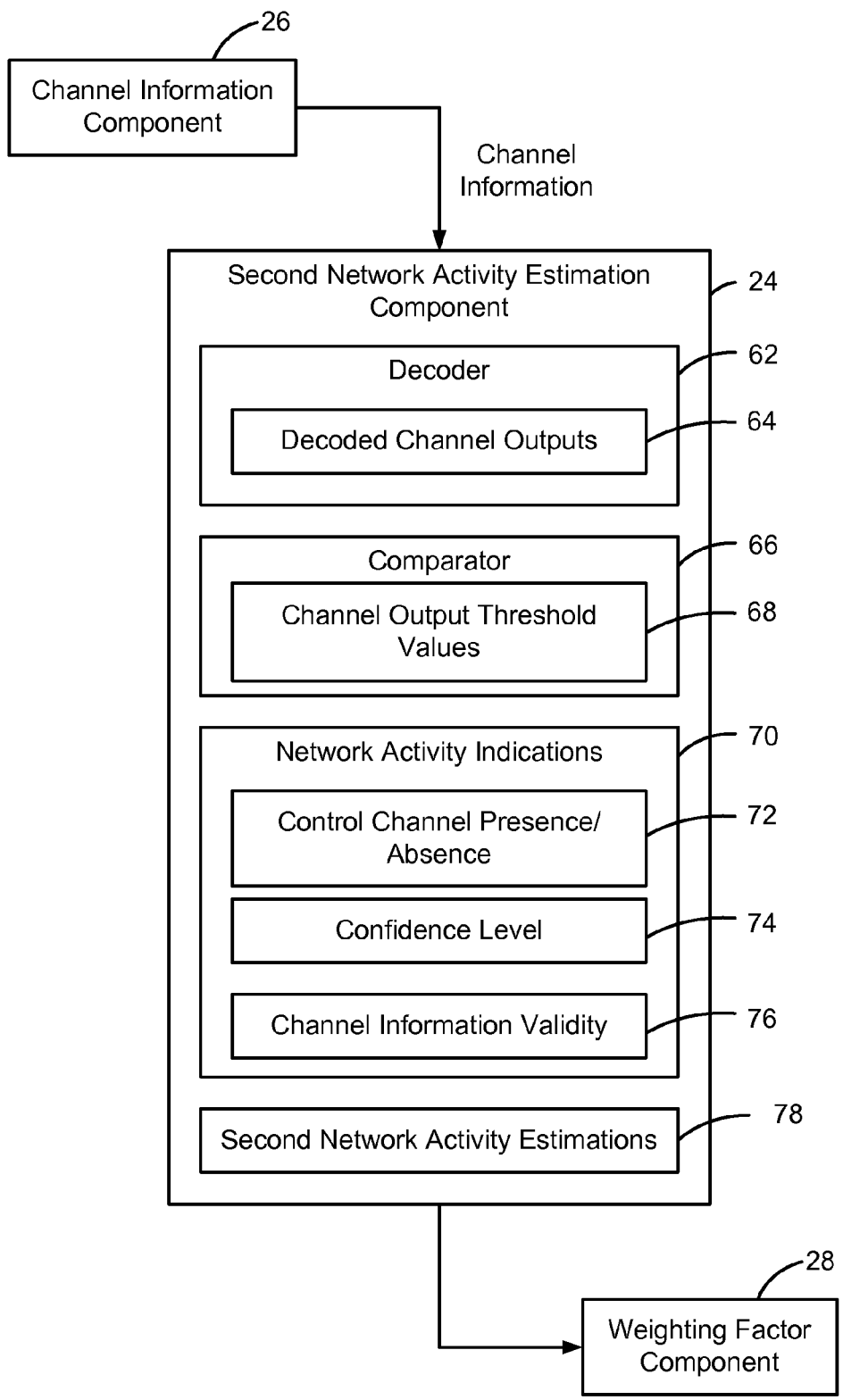
FIG. 3 is a schematic diagram of an aspect of the second network activity estimation component of FIG. 1.

Referring to FIG. 3, in an aspect, the second network activity estimation component 60 includes various subcomponents configured to perform one or more second network activity estimations 78 utilizing the received channel information 16 from the channel information component 26. For example, the second network activity estimation component 60 may utilize one or more code portions of the channel information 16 to obtain one or more network activity indications 78. Second network activity estimation component 22 may include a decoder 62, which may be configured to decode and/or further process the channel information received from the channel information component 26. For instance, the decoder 62 may decode at least one of the first code portion and second code portion of the channel information 16. As a result, decoder 62 provides a decoded channel output 64. In some aspects, the decoded channel output 64 may represent a number of bit errors between an input and a re-encoded output. The decoded channel output 64 may signify a channel code confidence metric indicating the decoded confidence level based on the bit error. In other aspects, the decoded channel output 64 may represent a combined metric utilizing the amplitude 42 and/or energy 44 of the channel information 16 and the decoded confidence level based on the bit error. In some aspects, decoder 62 may be a Viterbi decoder. Further, the decoder can be user configurable such that implementation of the decoder is user specified with respect to the channel information 16. Further, in some aspects, the second network activity estimation component 60 may include a comparator 66, which may be configured to compare the decoded channel outputs 64 to one or more channel output threshold values 68. In other aspects, the comparator 66 may be embodied as part of the decoder 62, and as such at least some of the decoded channel outputs 64 of the decoder 62 may be the result of a comparison by the comparator 66 embodied within the decoder 62. Additionally, the second network activity estimation component 60 may include one or more network activity indications 70 signifying, for instance, the presence and/or absence of a user on a control channel code 72. Further, the confidence level 74 and channel information validity 76 may be determined by the decoder 62 or based on the decoded channel outputs 64. The network activity indications 78 may be forwarded to the weighting factor component 28.

Figure 4:
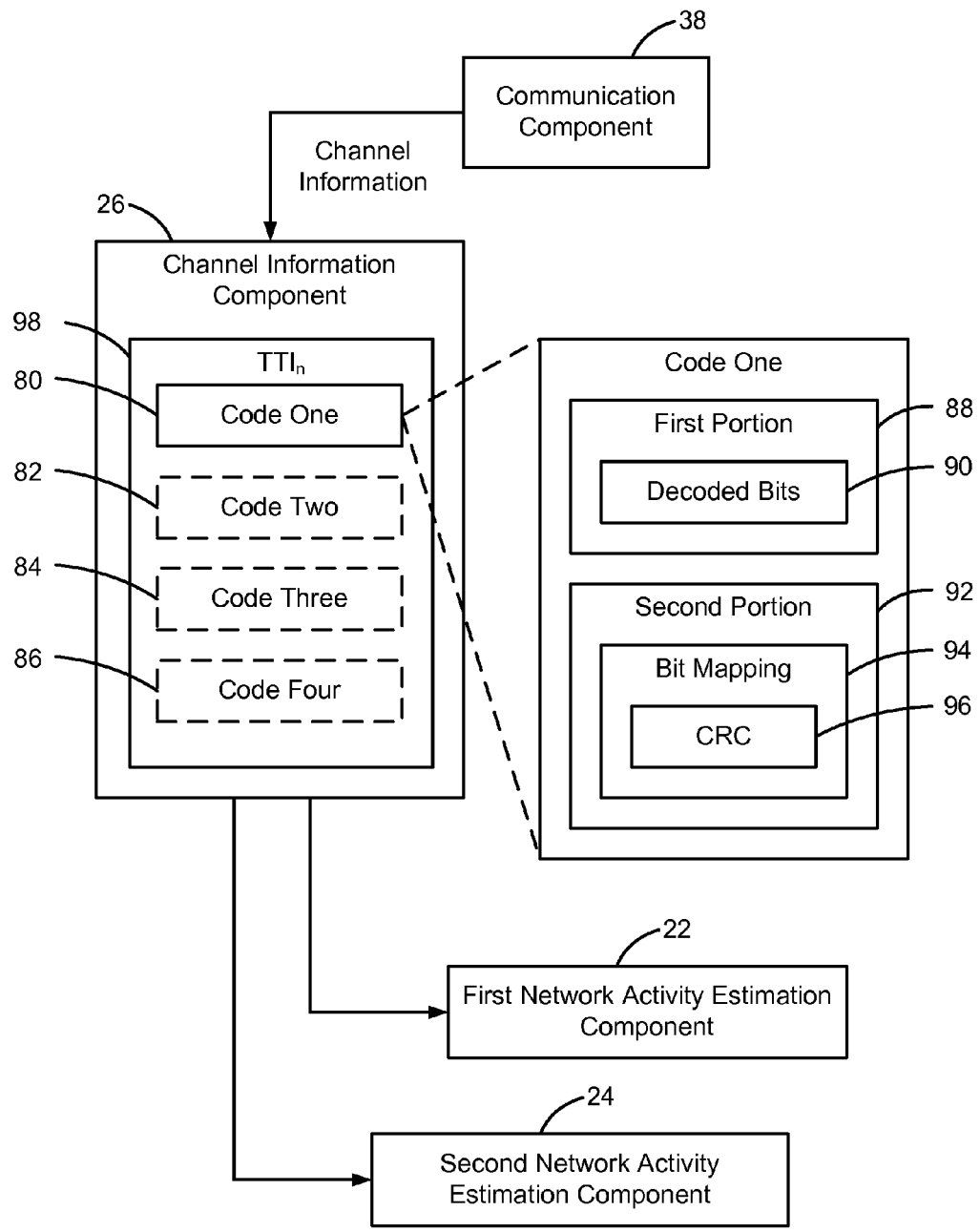
FIG. 4 is a schematic diagram of an aspect of the channel information component of FIG. 1.

Referring to FIG. 4, in an aspect, the channel information component 26 includes the channel information 16 received from the network via base station 14. The channel information component 26 is shown, by way of a non-limiting example, to store one or more codes for a given TTI 98 (e.g., $TTI_1$). For example, $TTI_n$ may contain one or more codes based on the code set allocation scheme by the base station 14. As such, in the example shown in FIG. 4, the channel information component 26 receives at least one code (e.g., code one 80) in the form of channel information 16 from the network in a single TTI. However, it should be understood that channel information component 26 may store, based on the received channel information 16, additional channel codes for subsequent processing. In some aspects, the channel information 16 may be in the form of channel codes including a first portion 88 and a second portion 92. First portion 88 may include the codes to despread relating to the UE's 12 capability in which each UE category indicates whether the UE 12 can despread, for example, a maximum of 5, 10, or 15 codes. Further, the first portion 88 may include modulation information (e.g., quadrature phase shift keying). In some cases, such information may be in the form of eight decoded bits. Second portion 92 may include redundancy version information to allow proper decoding and combining with earlier transmissions. Further, the UE 12 maps the second portion 92 to a specific bit size (e.g., 29 bits). Of the bit mapping 94, a portion is represented as the cyclic redundancy check (CRC) 96. For example, the first network activity estimation component 22 and the second network activity estimation component 24 may receive and process at least one of the first portion 88 and second portion 92 of the channel information 16 in a desired TTI (e.g., $TTI_n$ 98). Moreover, it should be understood that channel information component 26 may receive and store channel information 16 including one or more codes corresponding to a plurality of channel types, such as SCCH, PDSCH, and any other communication channels. Channel information component 26 may provide the channel codes (e.g., 80, 82, 84 and/or 86) to the first network activity estimation component 22 and the second network activity estimation component 24.

Figure 5:
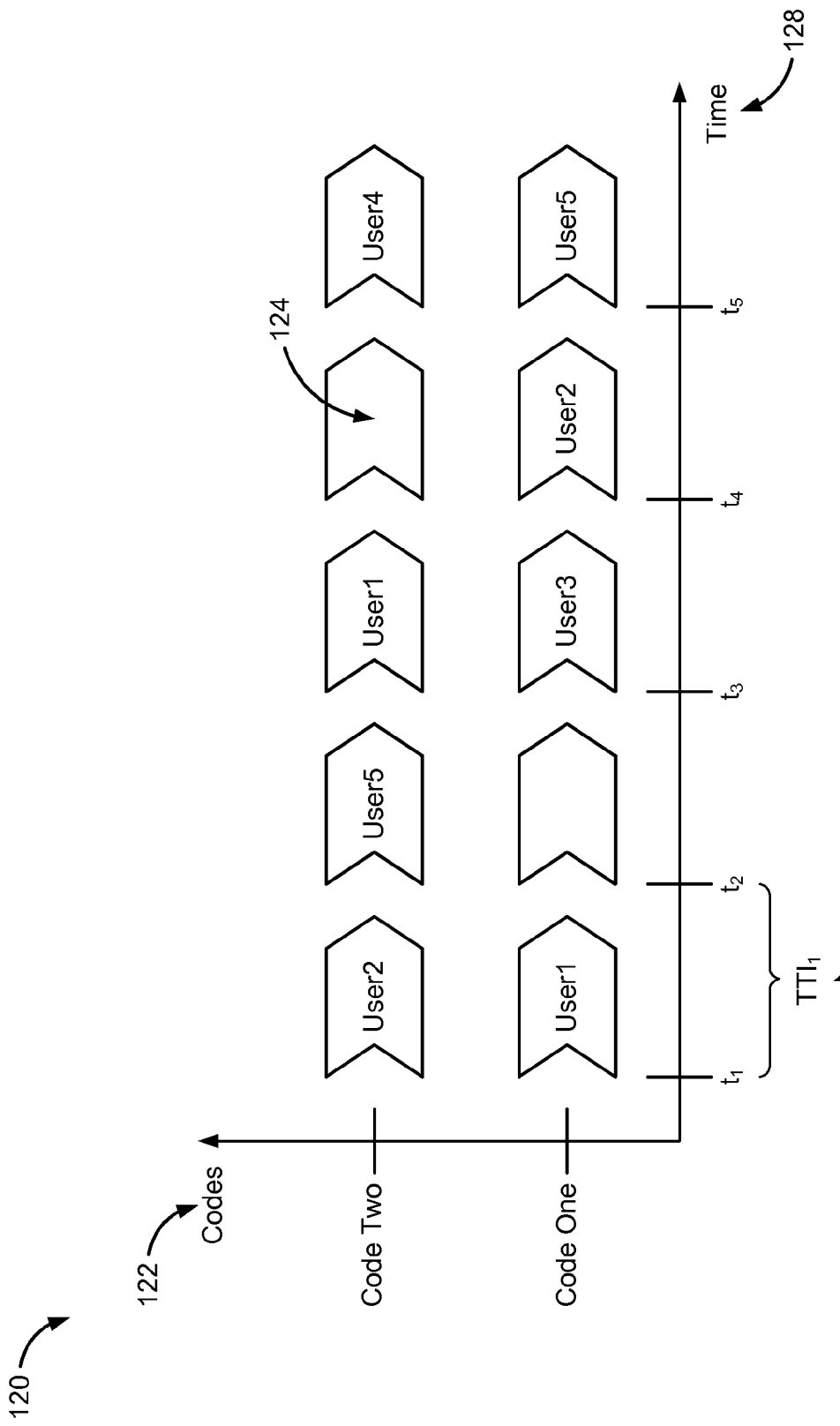
FIG. 5 is a conceptual diagram of a code allocation scheme for a control channel, e.g., according to FIG. 1.

Referring to FIG. 5, in an aspect, a code allocation scheme 120 for a shared control channel (e.g., SCCH) is provided. For example, the code allocation scheme 120 provides codes 122 including one or more TTIs 126 along the time axis 128. In some aspects, a TTI may include one or more users designating various types of information including, but not limited to, scheduling information for a particular user on a particular channel. The channel monitoring component 20 (FIG. 1) may be configured to determine and identify the presence and/or absence of users for channel information 16 in the form of one or more channel codes 122. In other words, codes 122 may be one or more codes (e.g., code one, code two, etc.), each of which may be included in one or more channel information 16. On the other hand, codes 122 may be entirely included in channel information 16 received from the network. Hence, the channel monitoring component 20 may, for example, be configured to determine and identify the absence of a user 124 in code two of the TTI at time $t_4$. Such determinations provide an estimated network activity in the form of a network activity indication for a particular channel code along one or more TTIs. The TTI duration may be implementation specific and/or pre-defined based upon network or node conditions. For example, the TTI may, in some non-limiting cases, be 2 milliseconds in duration. Thus, the channel monitoring component 20 may execute the network activity estimation components to determine at every TTI (e.g., 2 ms), the presence and/or absence of a user for each received code of channel information 16, and subsequently aggregate the network activity indications for a desired or pre-defined number of intervals (e.g., 500 TTIs).

Figure 6:
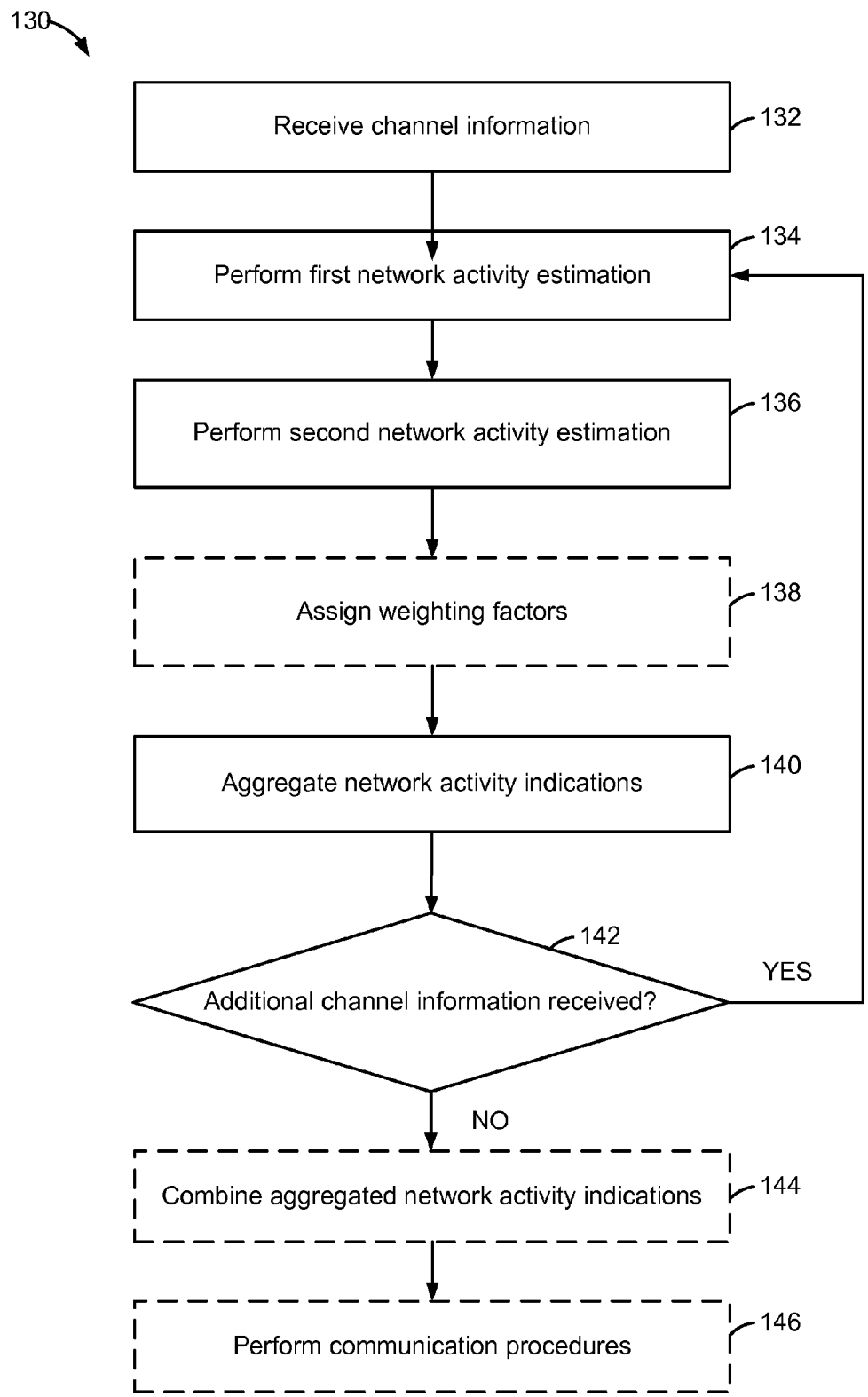
FIG. 6 is a flowchart of an aspect of a method of wireless communication, e.g., according to FIG. 1.

Referring to FIG. 6, in operation, a UE such as UE 12 (FIG. 1) may perform one aspect of a method 130, for performing network activity estimations. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 132, the method 130 includes receiving channel information. For example, as described above, UE 12 (FIG. 1) may execute the communication component 38 to receive channel information 16 from the network via the base station 14. Further, in some aspects, the channel monitoring component 20 may execute channel information component 26 to receive the channel information 16 from the communication component 38.

At block 134, the method 130 includes performing a first network activity estimation. For instance, as described above, channel monitoring component 20 (FIG. 1) may execute the first network activity estimation component 22 to perform a first network activity estimation 50 (FIG. 2). Further, the first network activity estimation component 22 may provide first network activity indications 52 to the aggregation component 32 and/or weighting factor component 28.

Further, at block 136, method 130 includes performing second network activity estimation. For example, as disclosed above, channel monitoring component 20 (FIG. 1) may execute the second network activity estimation component 24 to perform a second network activity estimation 78 (FIG. 2). Further, the second network activity estimation component 24 may provide second network activity indications 70 to the aggregation component 32 and/or weighting factor component 28.

Optionally, at block 138, the method 130 includes assigning weighting factors. For example, in the aforementioned disclosure, channel monitoring component 20 (FIG. 1) may execute weighting factor component 26 assign a weighting factor value 30 to network activity indications. Moreover, the weighting factor component 28 may assign weighting factor values 30 signifying a level of significance and/or effect the network activity indications (e.g., indications 52 and 70) have in a subsequent aggregation of multiple network activity indications by the aggregation component 32. For instance, the weighting factor values 30 assigned to the network activity indications 70 of the second network activity estimation component 24 may be higher than the network activity indications 52 of the first network activity estimation component 22.

At block 140, the method 130 includes aggregating network activity indications. For example, as described above, channel monitoring component 20 (FIG. 1) may execute the aggregation component 32 to aggregate the network activity indications (e.g., indications 52 and 70). Moreover, in other aspects, the aggregation component 32 may execute the sub-aggregation component 34 to aggregate the network activity indications. As a non-limiting example, the sub-aggregation component 34 may aggregate or otherwise combine the network activity indications of one or more channel code portions for one or more TTIs. For instance, in some cases, the sub-aggregation component 34 may aggregate the network activity indications within a TTI. Additionally, the aggregation may be an arithmetic operation using the weighted and/or modified network activity indications.

Further aspects of method 130 include determining whether additional channel information is received at block 142. For example, as described above, UE 12 (FIG. 1) may execute the channel monitoring component 20 to determine whether additional channel information 16 is received. The channel monitoring component 20 may monitor or otherwise receive indications from the channel information component 26 signifying additional channel information 16. Additional channel information may include subsequent channel information including, for example, a first code portion and a second code portion.

At block 144, the method 130 includes combining the aggregated network activity indications. For example, as described above, channel monitoring component 20 (FIG. 1) may execute the aggregation component 32 to combine the aggregated network activity indications. In some aspects, the aggregation component 32 may combine or further aggregate the previously aggregated network activity indications (e.g., indications 52 and 70) of one or more code portions for a series of TTI across all TTIs. That is, in some cases, the aggregation component 32 may combine or otherwise aggregate the aggregated network activity indications 36 for every TTI within a total desired or pre-defined time period. Further, in some cases, the aggregation may be an arithmetic operation using the weighted and/or modified network activity indications.

Finally, at block 146, the method 130 may optionally include performing communication procedures. For instance, based on the foregoing disclosure, the UE 12 may execute the procedure component 37 to perform one or more communication procedures based on the aggregated network activity indications (e.g., indications 52 and 70 from FIGS. 2 and 3, respectively). Such communication procedures may include predictions and/or estimations related to user experience characteristics (e.g., throughput). Further, such predictions may provide the UE 12 with advanced activity scheduling capabilities. For example, the UE 12 may avoid establishing active connections during expected periods of high network activity. Additionally, the predictions may enable UE 12 to select from a plurality of available network connections based on network activity (e.g., load).

Figure 7:
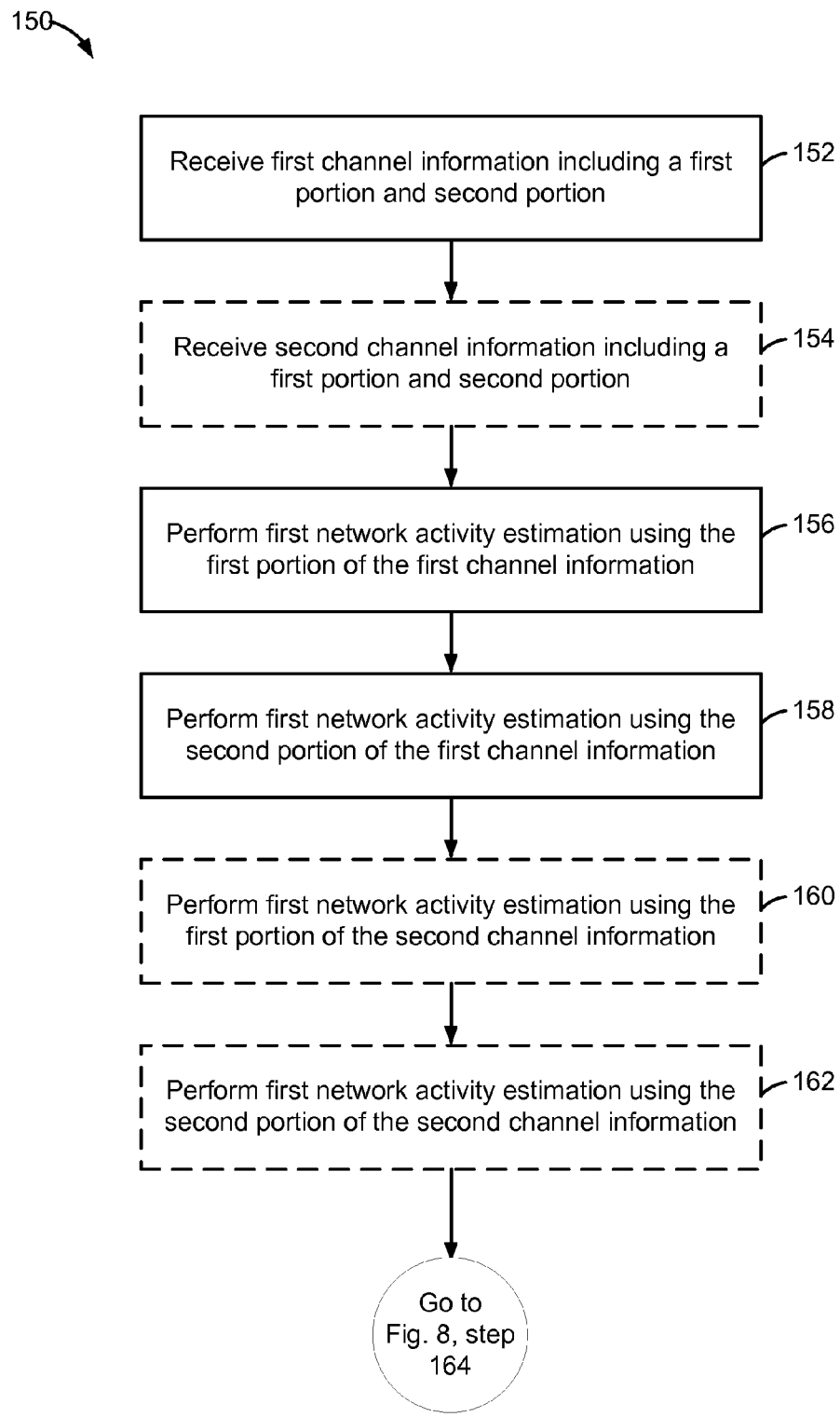
FIG. 7 is a flowchart of a further aspect of a method of wireless communication, e.g., according to FIG. 1

Referring to FIG. 7, in operation, a UE such as UE 12 (FIG. 1) may perform one aspect of a method 150, for performing network activity estimations. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 152, the method 150 includes receiving first channel information including a first portion and second portion. For example, as described above, UE 12 (FIG. 1) may execute the communication component 38 to receive first channel information including first and second portions (FIG. 4) from the network via the base station 14. Further, in some aspects, the channel monitoring component 20 may execute channel information component 26 to receive the first channel information including first and second portions from the communication component 38.

Optionally, at block 154, the method 150 may include receiving second channel information including a first portion and second portion. For example, based on the aforementioned description, UE 12 (FIG. 1) may execute the communication component 38 to receive second channel information including first and second portions (FIG. 4) from the network via the base station 14. Further, in some aspects, the channel monitoring component 20 may execute channel information component 26 to receive the second channel information including first and second portions from the communication component 38.

At block 156, the method 150 includes performing the first network activity estimation for the first portion of the first channel information. For example, as the foregoing describes, channel monitoring component 20 (FIG. 1) may execute the first network activity estimation component 22 to perform a first network activity estimation 50 (FIG. 2) utilizing the first portion of the first channel information (FIG. 4). Further, the first network activity estimation component 22 may provide first network activity estimations 50 of the first portions to the aggregation component 32 and/or weighting factor component 28.

Further, at block 158, the method 150 includes performing the first network activity estimation for the second portion of the first channel information. For instance, as described above, channel monitoring component 20 (FIG. 1) may execute the first network activity estimation component 22 to perform a first network activity estimation 50 (FIG. 2) utilizing the second portion of the first channel information (FIG. 4). Further, the first network activity estimation component 22 may provide first network activity estimations 50 of the second portions to the aggregation component 32 and/or weighting factor component 28.

In some cases, the method 150 may include performing the first network activity estimation for the first portion of the second channel information at block 160. For example, in the aforementioned description, channel monitoring component 20 (FIG. 1) may execute the first network activity estimation component 22 to perform a first network activity estimation 50 (FIG. 2) utilizing the first portion of the second channel information (FIG. 4). Further, the first network activity estimation component 22 may provide first network activity estimations 50 of the first portions to the aggregation component 32 and/or weighting factor component 28.

Further optional aspects of method 150 may include performing the first network activity estimation for the second portion of the second channel information. For example, as described above, channel monitoring component 20 (FIG. 1) may execute the first network activity estimation component 22 to perform a first network activity estimation 50 (FIG. 2) utilizing the second portion of the second channel information (FIG. 4). Further, the first network activity estimation component 22 may provide first network activity estimations 50 of the second portions to the aggregation component 32 and/or weighting factor component 28.

Figure 8:
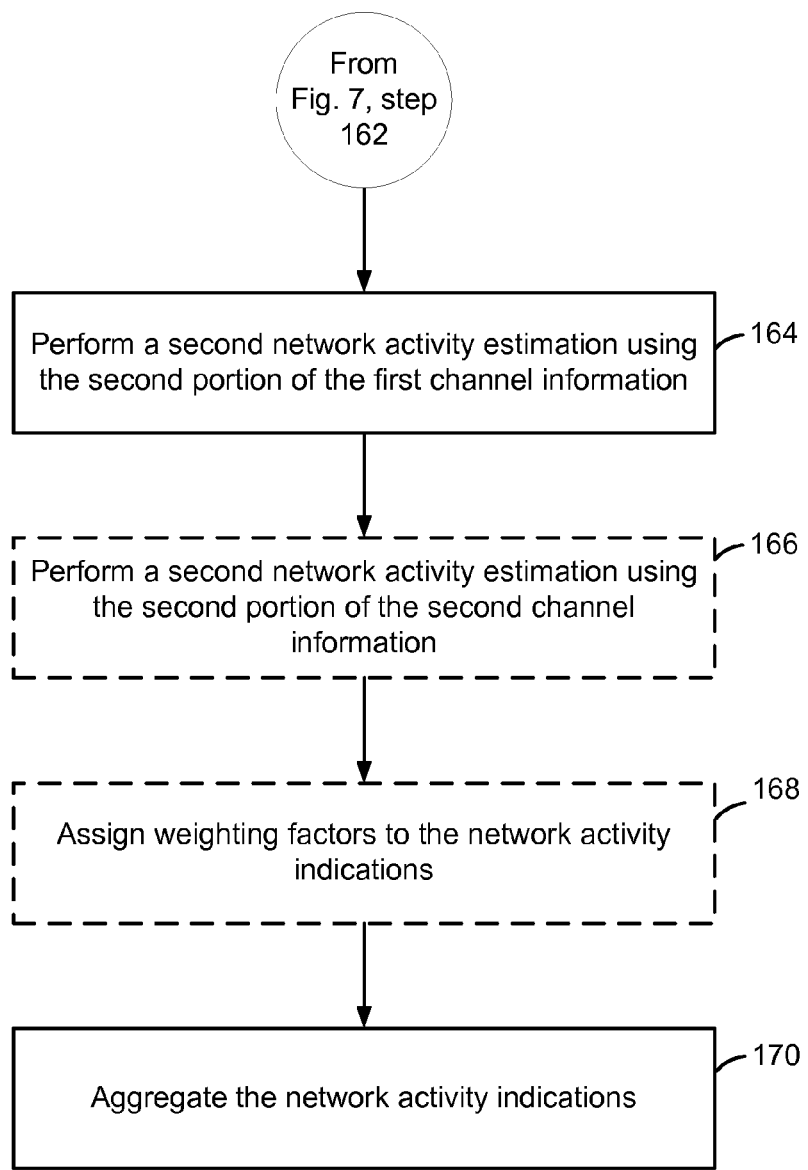
FIG. 8 is a flowchart of an aspect of the method of wireless communication according to FIG. 7.

Method 150 may continue at block 164 (FIG. 8), which includes performing a second network activity estimation for the second portion of the first channel information. As an example, in the foregoing disclosure, channel monitoring component 20 (FIG. 1) may execute the second network activity estimation component 24 to perform a second network activity estimation 78 (FIG. 2) using the second portion of the first channel information. Further, the second network activity estimation component 24 may provide second network activity estimations 70 of the second portions to the aggregation component 32 and/or weighting factor component 28.

At block 166, the method 150 may optionally include performing a second network activity estimation for the second portion of the second channel information. For instance, as described above, channel monitoring component 20 (FIG. 1) may execute the second network activity estimation component 24 to perform a second network activity estimation 78 (FIG. 2) using the second portion of the second channel information. Further, the second network activity estimation component 24 may provide second network activity estimations 70 of the second portions to the aggregation component 32 and/or weighting factor component 28

Optionally, at block 168, the method 150 may include assigning weighting factors to the network activity indications. For example, in the aforementioned descriptions, channel monitoring component 20 (FIG. 1) may execute weighting factor component 26 to assign a weighting factor value 30 to network activity indications, including each network activity indication generated based on the channel information portions. Moreover, the weighting factor component 28 may assign weighting factor values 30 signifying a level of significance and/or effect the network activity indications have in a subsequent aggregation of multiple network activity indications.

Finally, at block 170, the method 150 includes aggregating the network activity indications. For instance, as described above, channel monitoring component 20 (FIG. 1) may execute the aggregation component 32 to aggregate the weighted network activity indications. Moreover, in other aspects, the aggregation component 32 may execute the sub-aggregation component 34 to aggregate the weighted network activity indications. As a non-limiting example, the sub-aggregation component 34 may aggregate or otherwise combine the weighted network activity indications of one or more code portions for a TTI (e.g., first portion of first channel information). In some cases, the sub-aggregation component 34 may aggregate the network activity indications within a TTI (e.g., first channel information and second channel information). In some cases, the aggregation may be an arithmetic operation using the weighted and/or modified network activity indications. In other aspects, the aggregation component 32 may combine or further aggregate the previously aggregated network activity indications of one or more code portions for a series of TTI across all TTIs (FIG. 5). For instance, in some cases, the aggregation component 32 may combine or otherwise aggregate the aggregated network activity indications 36 for every TTI within a total desired or pre-defined time period. Further, in some cases, the aggregation may be an arithmetic operation using the weighted and/or modified network activity indications.

Figure 9:
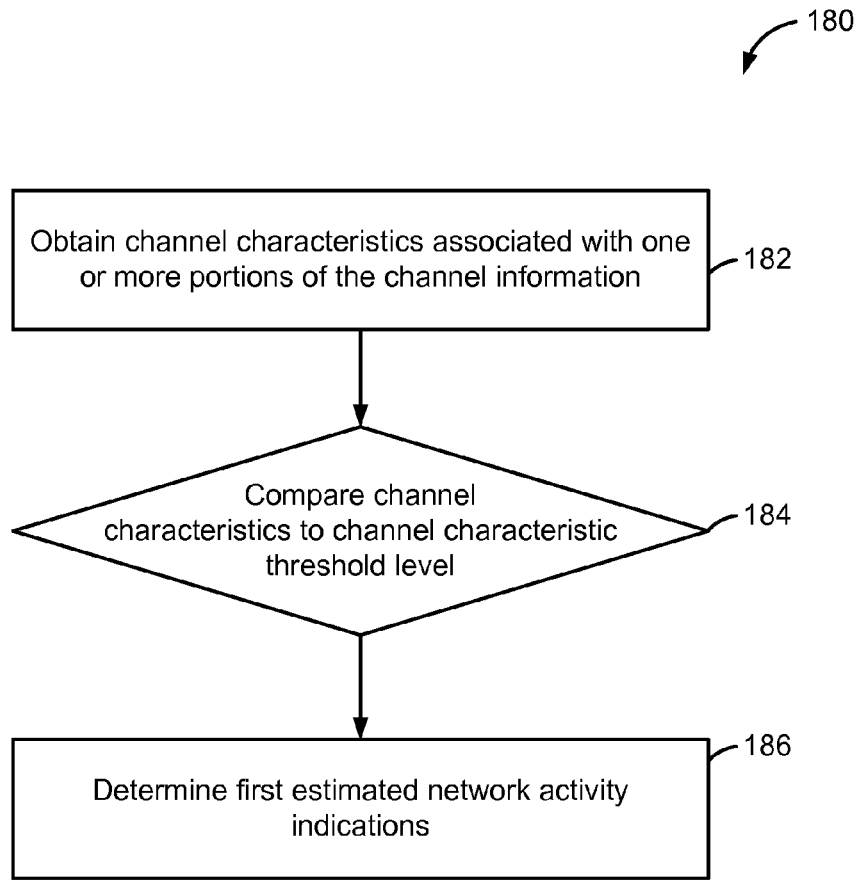
FIG. 9 is a flowchart of an aspect of the first network activity estimation, e.g., according to FIG. 1.

Referring to FIG. 9, one aspect of the first network activity estimation is provided. The method 180 may begin at block 182, which includes obtaining a channel characteristic associated with the first code portion and second code portion of the channel information. For example, the first network activity estimation component 22 (FIG. 2) may execute the channel characteristic component 40 to obtain channel characteristics (e.g., amplitude 42 and/or energy 44) associated with the first portion and second portion of the channel information 16 (FIG. 4).

At block 184, method 180 includes comparing the channel characteristic to a channel characteristic threshold level. For example, as described above, the first network activity estimation component 22 (FIG. 2) may execute comparator 46 to compare the channel characteristics (e.g., amplitude 42 and/or energy 44) to a channel characteristic threshold level 48.

Additionally, method 180 includes determining the network activity indications for each code portion based on the comparison at block 186. For example, as described above, the first network activity estimation component 22 (FIG. 2) may execute first network activity estimations 50 to generate or otherwise provide one or more network activity indications 52.

Figure 10:
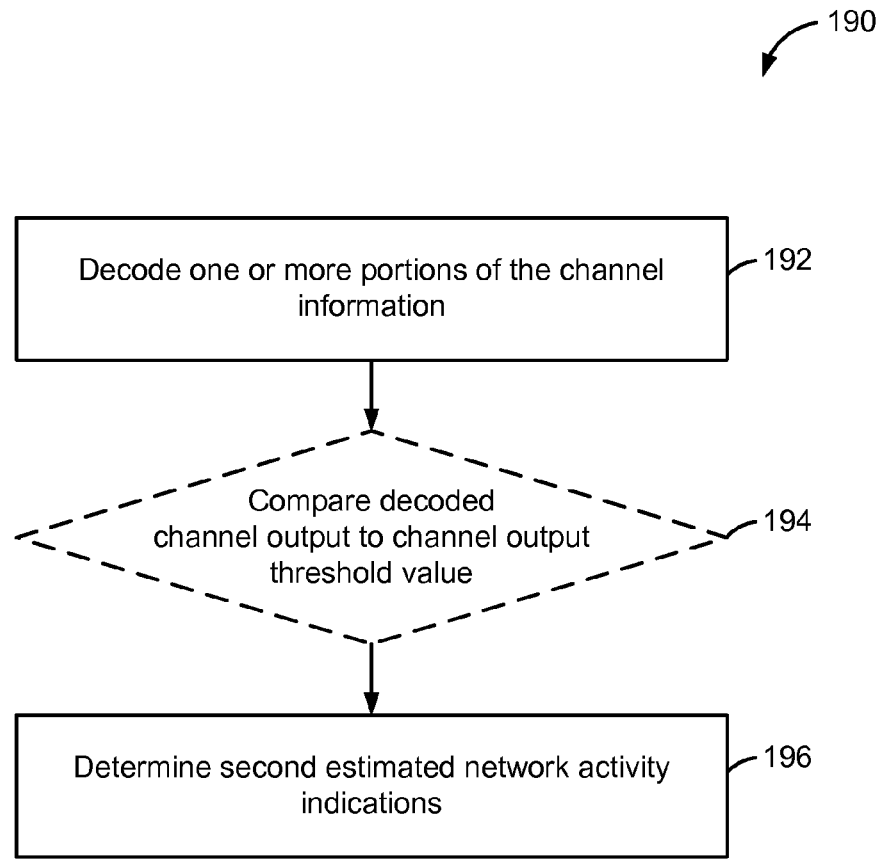
FIG. 10 is a flowchart of an aspect of the second network activity estimation, e.g., according to FIG. 1.

Referring to FIG. 10, in one aspect, the second network activity estimation is provided. At block 192, the method 190 includes decoding one or more portions of the channel information. For instance, as described above, the second network activity estimation component 60 (FIG. 3) may execute decoder 62 to decode one or more portions of the channel information and provide or otherwise generate decoded channel outputs 64.

Optionally, at block 194, the method 190 may include comparing decoded channel outputs to one or more channel output threshold values. For example, as described above, second network activity estimation component 60 (FIG. 3) may execute comparator 66 to compare decoded channel outputs 64 to one or more channel output threshold values 68.

Further, at block 196, method 190 may include determining second estimated network activity indications. For example, as described above, second network activity estimation component 60 (FIG. 3) may provide or otherwise generate second estimated network activity indications 70 as a result of executing one or more second network activity estimations 78.

For example, in one use case that should not be construed as limiting, the present methods and apparatus may be implemented to receive channel information comprising HS-SCCH OVSF codes. Upon receiving the channel information, a first network activity estimation is made using only HS-SCCH part one for a particular HS-SCCH OVSF. The aforementioned first estimation may utilize the amplitude and/or energy and may utilize a Viterbi decoder to determine the presence and/or absence of signaling on part one. Further, a second network activity estimation is made using only HS-SCCH part two for the same HS-SCCH OVSF. The aforementioned second estimation may utilize the amplitude and/or energy and may utilize a Viterbi decoder to determine the presence and/or absence of signaling on part two. Both estimations provide network activity indications. The foregoing estimations may be repeated for each HS-SCCH OVSF code received as part of the channel information. Moreover, the network activity indications may be aggregated to determine whether the overall network activity on the channel information, and thus estimate the channel load.

In a further example describing another use case not to be construed as limiting, the present methods and apparatus may be implemented to receive channel information comprising HS-SCCH OVSF codes and HS-PDSCH OVSF codes. A first estimation on HS-SCCH OVSF codes may be analyzed similarly as in the foregoing use case (e.g., estimations on part one and part two). A second activity estimation may utilize the amplitude and/or energy to determine the presence and/or absence of payload on each of the 15 HS-PDSCH OVSF codes. The indications may be aggregated for each type of code (e.g., HS-SCCH or HS-PDSCH), and also subsequently aggregated across codes. The resulting indication provides an estimated network activity level (e.g., network load).

Figure 11:
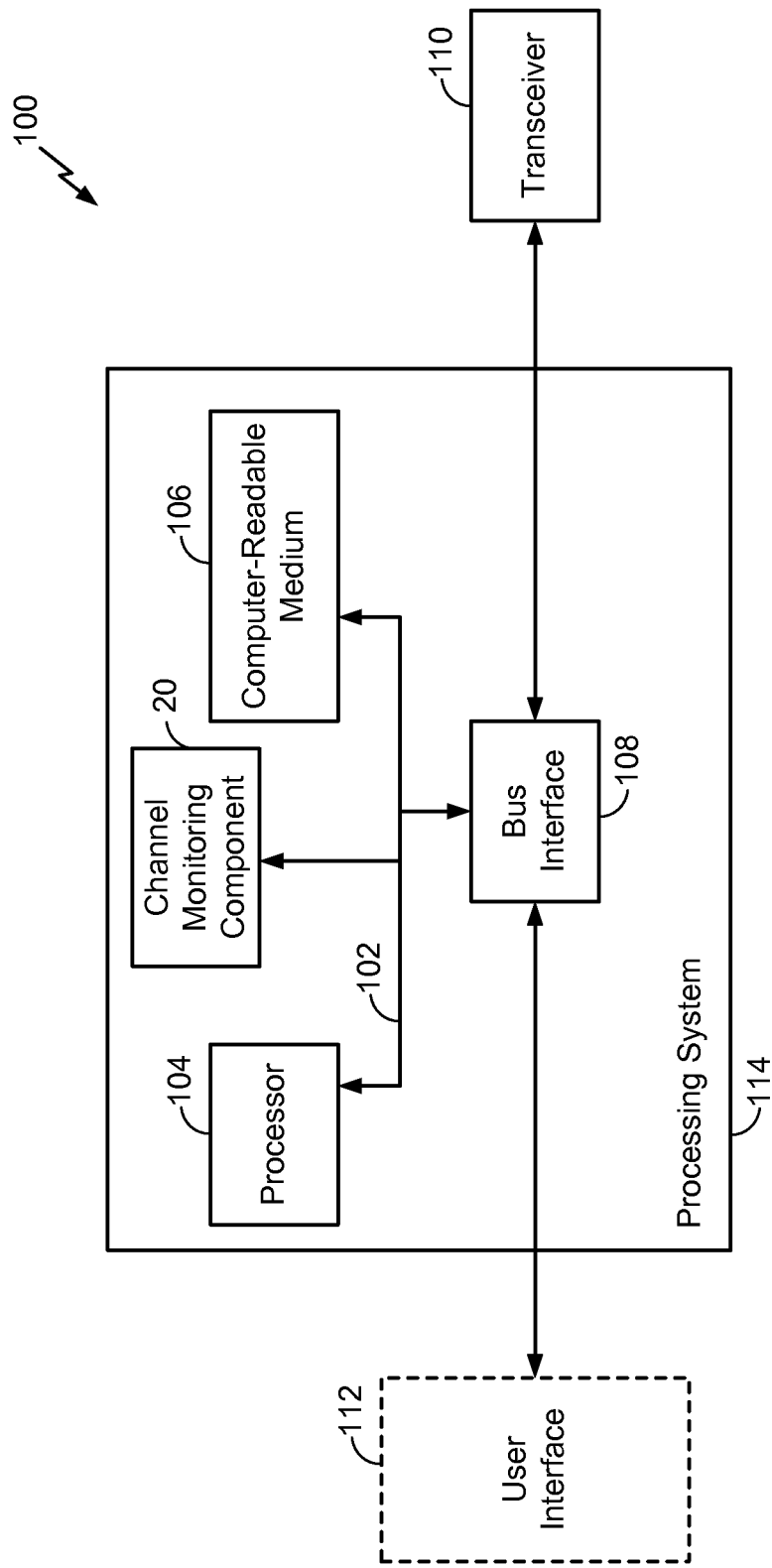
FIG. 11 is a block diagram illustrating an example of a hardware implementation for an apparatus employing a processing system including an aspect of the user equipment described herein.

FIG. 11 is a block diagram illustrating an example of a hardware implementation for an apparatus 100 employing a processing system 114, wherein apparatus 100 may be the same as or similar to UE 12 executing at least channel monitoring component 20 (FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, computer-readable media, represented generally by the computer-readable medium 106, and UE components (e.g., UE 12), such as the channel monitoring component 20.

The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Further, the channel monitoring component 20 (FIG. 1) may be implemented by any one or more of processor 104 and computer-readable medium 106. For example, the processor and/or computer-readable medium 106 may be configured to, via the channel monitoring component 20, to perform various network activity estimations and aggregations in a wireless communications device (e.g., UE 12).

The various concepts presented throughout this disclosure may be implemented across a broad variety of telecommunication systems, network architectures, and communication standards.

Figure 12:
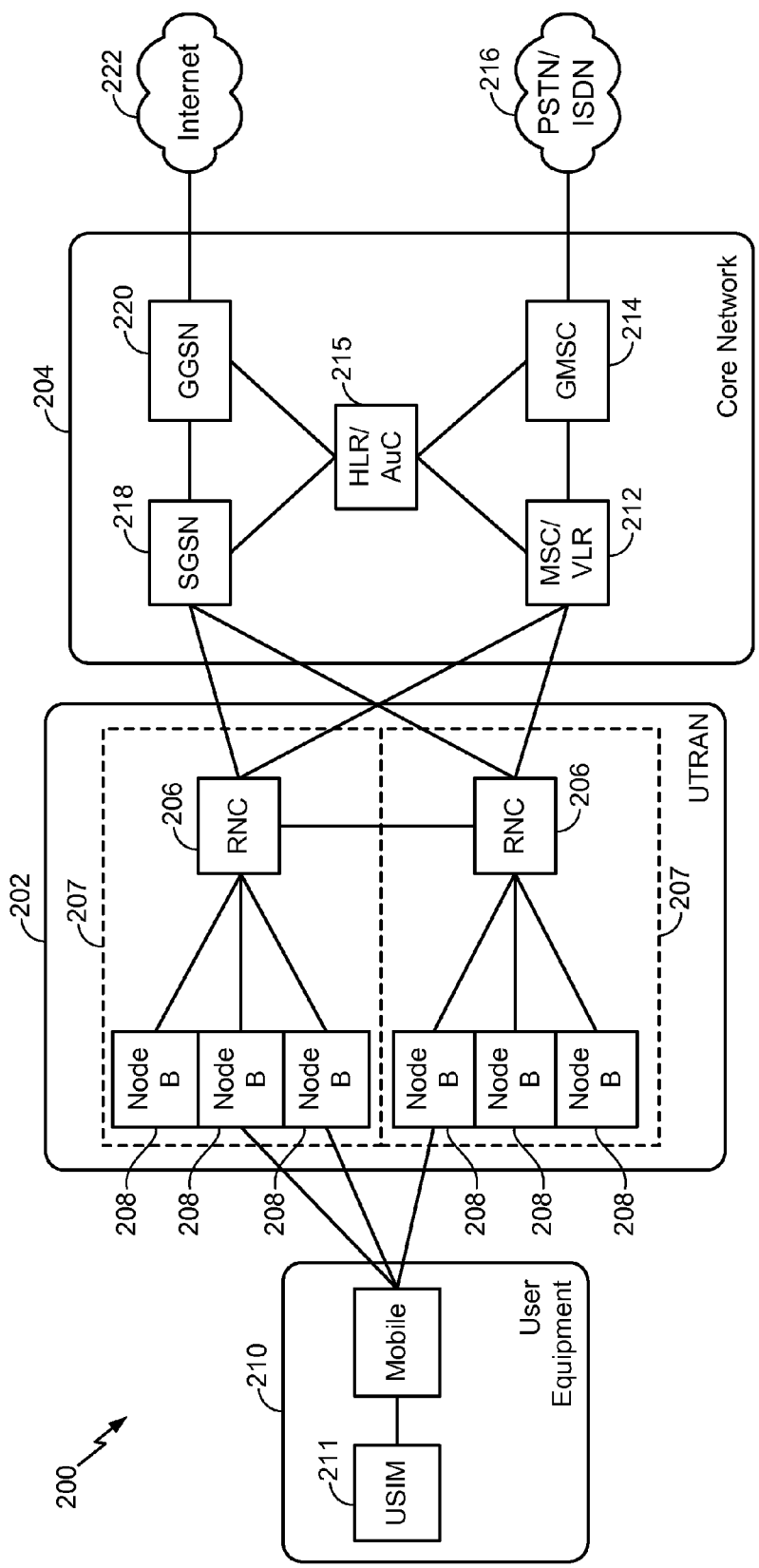
FIG. 12 is a block diagram conceptually illustrating an example of a telecommunications system including an aspect of the user equipment described herein.

By way of example and without limitation, the aspects of the present disclosure illustrated in FIG. 12 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210 that may be the same as UE 12 including channel monitoring component 20 (FIG. 1). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 13:
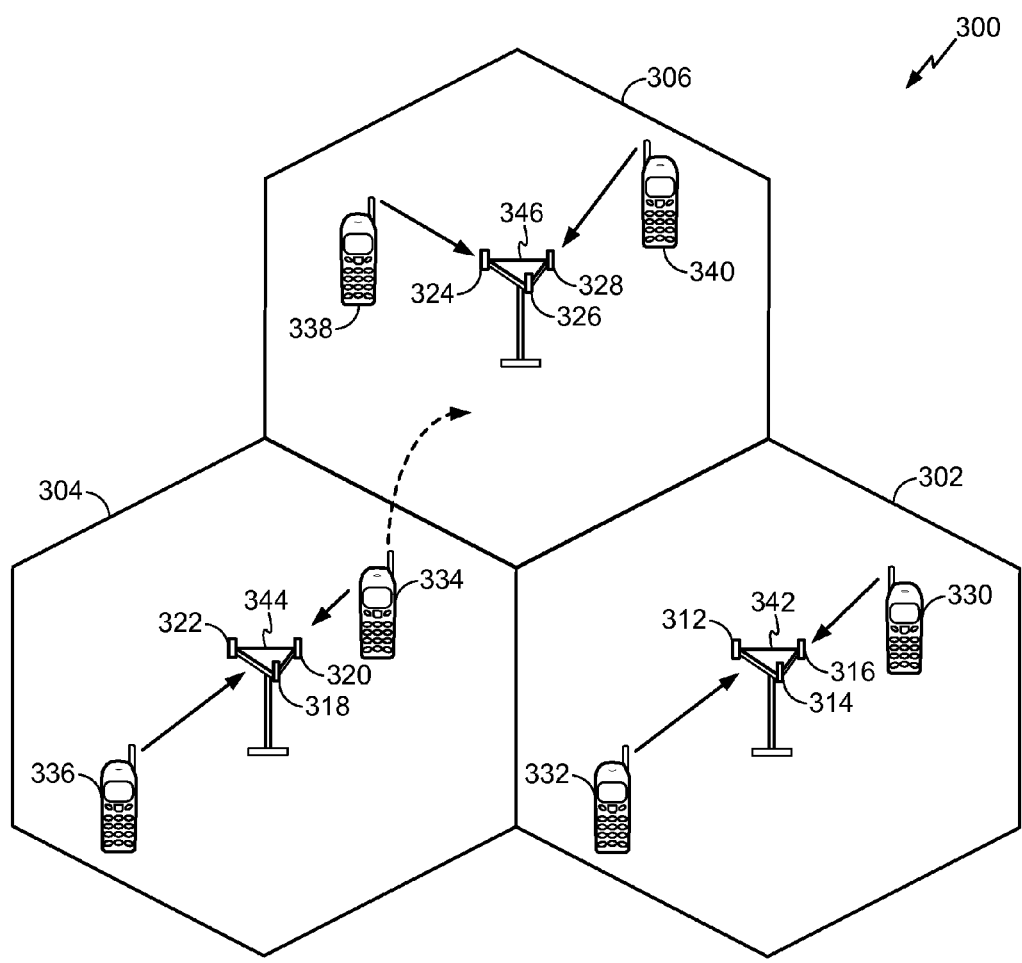
FIG. 13 is a conceptual diagram illustrating an example of an access network including an aspect of the user equipment described herein.

Referring to FIG. 13, an access network 300 in a UTRAN architecture is illustrated in which a UE, such as a UE the same as or similar to UE 12 (FIG. 1) may operate. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306. In an aspect, the UEs 330, 332, 334, 336, 338 and/or 340 may include the channel monitoring component 20 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 12), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 14.

Figure 14:
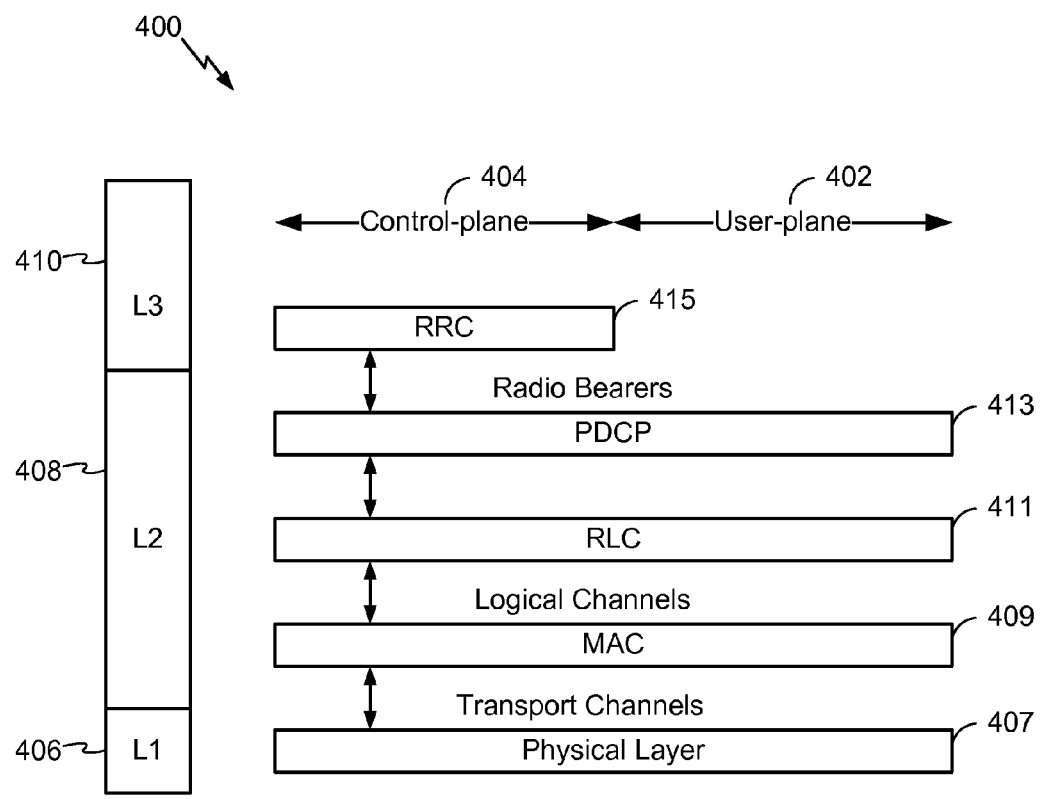
FIG. 14 is a conceptual diagram illustrating an example of a radio protocol architecture for the user and control plane that may be utilized by the user equipment of FIG. 1.

Referring to FIG. 14 an example radio protocol architecture 400 relates to the user plane 402 and the control plane 404 of a user equipment (UE) or node B/base station. For example, architecture 400 may be included in a UE such as UE 12 including channel monitoring component 20 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 15:
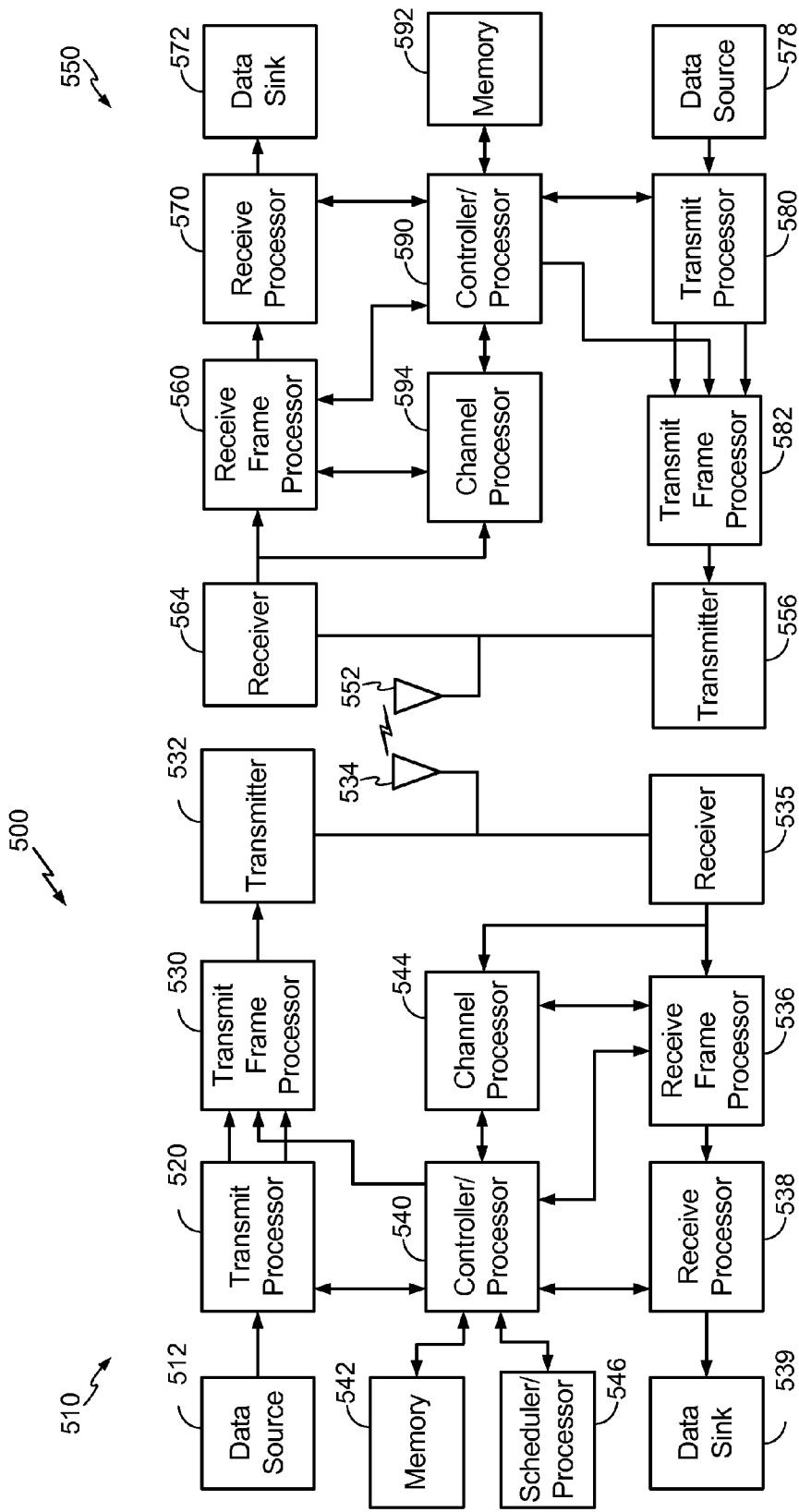
FIG. 15 is a block diagram conceptually illustrating an example of a Node B in communication with a user equipment in a telecommunications system, e.g., the user equipment of FIG. 1.

FIG. 15 is a block diagram of a Node B 510 in communication with a UE 550, where the Node B 510 may be the Node B 208 in FIG. 12, and the UE 550 may be the UE 210 in FIG. 12 or the UE 12 in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 564 receives the downlink transmission through an antenna 552 and processes the transmission to recover the information modulated onto the carrier. The information recovered by the receiver 564 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
receiving channel information comprising a first code portion and a second code portion of a high-speed shared communication channel (HS-SCCH) orthogonal variable spreading factor (OVSF) code;
performing a first network load estimation using at least the first code portion of an HS-SCCH OVSF code, wherein the first network load estimation provides a first network load utilization indication; and comprises:
obtaining a channel characteristic associated with one or both of the first code portion or the second code portion of the HS-SCCH OVSF code;
comparing the channel characteristic to a channel characteristic threshold level; and
determining at least the first network load utilization indication for the first code portion based on the comparison;
performing a second network load estimation using at least the second code portion of the HS-SCCH OVSF code, by determining a second network load utilization indication after decoding the second code portion of the HS-SCCH OVSF code, wherein the second network load estimation provides the second network load utilization indication different from the first network load utilization indication;
and aggregating the first network load utilization indication and the second network load utilization indication.

2. The method of claim 1, wherein the channel characteristic threshold level is determined dynamically based on channel tracking conditions.

3. The method of claim 1, wherein the second network load estimation comprises:
decoding at least one of the first code portion or the second code portion of the HS-SCCH OVSF code, wherein the decoding provides a decoded channel output; and
determining the second network load utilization indication based on the decoded channel output.

4. The method of claim 3, wherein the determined second network load utilization indication provides at least one of a presence or an absence of a shared control channel transmission.

5. The method of claim 3, further comprising calculating a confidence level value associated with determining the second network load utilization indication.

6. The method of claim 3, further comprising determining a validity of at least the first code portion and the second code portion of the HS-SCCH OVSF code.

7. The method of claim 3, wherein the decoding is performed by a Viterbi decoder.

8. The method of claim 1, further comprising:
assigning a weighting factor value for each of the first network load utilization indication and the second network load utilization indication.

9. The method of claim 1, further comprising:
receiving subsequent channel information including a first code portion and a second code portion.

10. The method of claim 9, further comprising:
repeating the first network load estimation on the first code portion and the second code portion of the subsequent channel information, wherein the repeated first network load estimation provides a first network load utilization indication of the subsequent channel information;
repeating the second network load estimation on at least one of the first code portion or the second code portion of the subsequent channel information, wherein the second network load estimation provides a second network load utilization indication of the subsequent channel information; and
aggregating the first network load utilization indication and the second network load utilization indication of the subsequent channel information.

11. The method of claim 9, wherein the first code portion and the second code portion of the subsequent channel information are of a spreading factor code.

12. The method of claim 11, wherein the spreading factor code is an OVSF code.

13. The method of claim 1, further comprising:
performing one or more communication procedures based on the aggregated network load utilization indications.

14. A non-transitory computer-readable medium comprising code that when executed on at least one processor causes the at least one processor to:
receive channel information comprising a first code portion and a second code portion of high-speed shared communication channel (HS-SCCH) orthogonal variable spreading factor (OVSF) code;
perform a first network load estimation using at least the first code portion of an HS-SCCH OVSF code, wherein the first network load estimation provides a first network load utilization indication and comprises:
obtain a channel characteristic associated with one or both of the first code portion or the second code portion of the HS-SCCH OVSF code;
compare the channel characteristic to a channel characteristic threshold level; and
determine at least the first network load utilization indication for the first code portion based on the comparison;
perform a second network load estimation using at least the second code portion of the HS-SCCH OVSF code, by determining a second network load utilization indication after decoding the second code portion of the HS-SCCH OVSF code, wherein the second network load estimation provides the second network load utilization indication different from the first network load utilization indication;
and aggregate the first network load utilization indication and the second network load utilization indication.

15. The non-transitory computer-readable medium of claim 14, wherein to perform the second network load estimation, the code causes the at least one processor to:
decode at least one of the first code portion or the second code portion of the HS-SCCH OVSF code, wherein the decoding provides a decoded channel output; and
determine the second network load utilization indication based on the decoded channel output.

16. The non-transitory computer-readable medium of claim 14, further comprising code that when executed on the at least one processor causes the at least one processor to:
assign a weighting factor value for each of the first network load utilization indication and the second network load utilization indication.

17. The non-transitory computer-readable medium of claim 14, further comprising code that when executed on the at least one processor causes the at least one processor to:

receive a subsequent channel information including a first code portion and a second code portion.

18. The non-transitory computer-readable medium of claim 17, further comprising code that when executed on the at least one processor causes the at least one processor to:
  repeat the first network load estimation on the first code portion and the second code portion of the subsequent channel information, wherein the repeated first network load estimation provides a first network load utilization indication of the subsequent channel information;
  repeat the second network load estimation on at least one of the first code portion or the second code portion of the subsequent channel information, wherein the second network load estimation provides a second network load utilization indication of the subsequent channel information; and
  aggregate the first network load utilization indication and the second network load utilization indication of the subsequent channel information.

19. An apparatus for wireless communication, comprising:
  means for receiving channel information comprising a first code portion and a second code portion of high-speed shared communication channel (HS-SCCH) orthogonal variable spreading factor (OVSF) code;
  means for performing a first network load estimation using at least the first code portion of an HS-SCCH OVSF code, wherein the first network load estimation provides a first network load utilization indication and comprises at least one means for:
  obtaining a channel characteristic associated with one or both of the first code portion or the second code portion of the HS-SCCH OVSF code;
  comparing the channel characteristic to a channel characteristic threshold level; and
  determining at least the first network load utilization indication for the first code portion based on the comparison;
  means for performing a second network load estimation using at least the second code portion of the HS-SCCH OVSF code, by determining a second network load utilization indication after decoding the second code portion of the HS-SCCH OVSF code, wherein the second network load estimation provides the second network load utilization indication different from the first network load utilization indication; and
  means for aggregating the first network load utilization indication and the second network load utilization indication.

20. The apparatus of claim 19, wherein the means for performing the second network load estimation comprises at least one means for:
  decoding at least one of the first code portion or the second code portion of the HS-SCCH OVSF code, wherein the decoding provides a decoded channel output; and
  determining the second network load utilization indication based on the decoded channel output.

21. The apparatus of claim 19, further comprising means for assigning a weighting factor value for each of the first network load utilization indication and the second network load utilization indication.

22. The apparatus of claim 19, further comprising means for receiving a subsequent channel information including a first code portion and a second code portion.

23. The apparatus of claim 22, further comprising at least one means for:
  repeating the first network load estimation on the first code portion and the second code portion of the subsequent channel information, wherein the first network load estimation provides a first network load utilization indication of the subsequent channel information;
  repeating the second network load estimation on at least one of the first code portion or the second code portion of the subsequent channel information, wherein the second network load estimation provides a second network load utilization indication of the subsequent channel information; and
  aggregating the first network load utilization indication and the second network load utilization indication of the subsequent channel information.

24. A user equipment apparatus for wireless communications, comprising:
  a memory; and
  a processor coupled to the memory and configured to:
  receive channel information comprising a first code portion and a second code portion of high-speed shared communication channel (HS-SCCH) orthogonal variable spreading factor (OVSF) code;
  perform a first network load estimation using at least the first code portion of an HS-SCCH OVSF code, wherein the first network load estimation provides a first network load utilization indication and comprises:
  obtain a channel characteristic associated with one or both of the first code portion or the second code portion of the HS-SCCH OVSF code;
  compare the channel characteristic to as channel characteristic threshold level; and
  determine at least the first network load utilization indication for the first code portion based on the comparison;
  perform a second network load estimation using at least the second code portion of the HS-SCCH OVSF code, by determining a second network load utilization indication after decoding the second code portion of the HS-SCCH OVSF code, wherein the second network load estimation provides the second network load utilization indication different from the first network load utilization indication; and
  aggregate the first network load utilization indication and the second network load utilization indication.

25. The apparatus of claim 24, wherein the channel characteristic threshold level is determined dynamically based on channel tracking conditions.

26. The apparatus of claim 24, wherein to perform the second network load estimation, the processor is further configured to:
  decode at least one of the first code portion or the second code portion of the HS-SCCH OVSF code, wherein the decoding provides a decoded channel output; and
  determine the second network load utilization indication based on the decoded channel output.

27. The apparatus of claim 26, wherein the determined second network load utilization indication provides at least one of a presence or an absence of a shared control channel transmission.

28. The apparatus of claim 26, wherein the processor is further configured to calculate a confidence level value associated with the determination of the second network load utilization indication.

29. The apparatus of claim 26, wherein the processor is further configured to determine a validity of at least the first code portion and the second code portion of the HS-SCCH OVSF code.

30. The apparatus of claim 26, further comprising a Viterbi decoder for performing the decoding.

31. The apparatus of claim 24, wherein the processor is further configured to assign a weighting factor value for each of the first network load utilization indication and the second network load utilization indication.

32. The apparatus of claim 24, wherein the processor is further configured to receive a subsequent channel information including a first code portion and a second code portion.

33. The apparatus of claim 32, wherein the processor is further configured to:
- repeat the first network load estimation on the first code portion and the second code portion of the subsequent channel information, wherein the first network load estimation provides a first network load utilization indication of the subsequent channel information;
- repeat the second network load estimation on at least one of the first code portion or the second code portion of the subsequent channel information, wherein the second network load estimation provides a second network load utilization indication of the subsequent channel information; and
- aggregate the first network load utilization indication and the second network load utilization indication of the subsequent channel information.

34. The apparatus of claim 32, wherein the first code portion and the second code portion of the subsequent channel information are of a spreading factor code.

35. The apparatus of claim 34, wherein the spreading factor code is an OVSF code.

\* \* \* \* \*